US006550637B1

(12) United States Patent
Erikawa

(10) Patent No.: US 6,550,637 B1
(45) Date of Patent: Apr. 22, 2003

(54) DRINK CUP SUPPLYING APPARATUS

(75) Inventor: Hajime Erikawa, Saitama-Ken (JP)

(73) Assignee: Fuji Electric Co, Ltd., Kanagawa (JP)

( * ) Notice: Subject to any disclaimer, the term of this patent is extended or adjusted under 35 U.S.C. 154(b) by 170 days.

(21) Appl. No.: 09/672,895

(22) Filed: Sep. 29, 2000

(30) Foreign Application Priority Data

Sep. 30, 1999 (JP) .......................................... 11-280469

(51) Int. Cl.[7] .......................... B65G 59/00; B65H 1/00; G07F 11/00

(52) U.S. Cl. ......................... 221/92; 221/119; 221/121; 221/120; 221/92; 414/795.6

(58) Field of Search ................................ 221/119, 121, 221/122, 120, 92; 414/795.6

(56) References Cited

U.S. PATENT DOCUMENTS 2,571,283 A * 10/1951 Nicholson .................... 225/21
4,480,764 A * 11/1984 Takagi et al. ................. 221/11
4,948,011 A * 8/1990 Mueller et al. ................ 221/1
5,000,345 A * 3/1991 Borgna et al. ................. 221/5
5,261,467 A * 11/1993 Yamamoto et al. ......... 141/174
6,053,359 A * 4/2000 Goulet et al. ............... 221/221

* cited by examiner

*Primary Examiner*—Donald P. Walsh
*Assistant Examiner*—Michael E Butler
(74) *Attorney, Agent, or Firm*—McDermott, Will & Emery

(57) ABSTRACT

A drink cup supplying apparatus in which cup replenishing work can be conducted easily in a short time and also maintenance characteristic is improved. In the apparatus, the main body 1 is enabled to be opened and closed in both faces by a pair of the front and back divided doors 2 and 3. Cup holding stands 5, on which vertically piled cup groups are placed, are disposed in a cup holding unit 4 in the main body 1 in a state that they are arranged in connected plural rows and capable of moving circularly and intermittently. Cup take-out mechanisms 6 are disposed inside the orbit X of the cup holding stands 5. And, cup push-out-loading mechanisms 7, which push out the cup groups placed on the cup holding stands 5 to the cup take-out mechanisms 6 for loading, are disposed on the reverse side 3*a* of one divided door 3.

6 Claims, 3 Drawing Sheets

5 : CUP HOLDING STAND
6 : CUP TAKE-OUT MECHANISM
7 : CUP PUSH-OUT-LOADING MECHANISM
8 : PILED CUPS
14 : PIN
15 : SUPPORTING UNIT
16A : LINK
16B : LINK
17A : PIN
17B : PIN
18 : PUSHING MATERIAL
19 : PIN
20 : LINK
21 : DRIVING SLIDER
21A : DRIVING FORCE TRANSMISSION UNIT
22 : PIN
23 : GUIDE GROOVE

DRINK CUP SUPPLYING APPARATUS

FIELD OF THE INVENTION

This invention relates to a drink cup supplying apparatus to be installed in a cup type automatic vending machine which sells soft drinks such as coffee, juice etc. in BIB (BAG IN BOX) unit.

BACKGROUND OF THE INVENTION

Conventionally, in a drink cup supplying apparatus in a cup type automatic vending machine of this kind, for example, there is such type of apparatus as disclosed in Japanese examined patent publication No.62-44316 etc. The structure is that cup groups, which are piled vertically and to be loaded in cup take-out mechanisms, are disposed and held in a cup holding unit within the main body of the apparatus, in circularly movable state and in being enabled to be supplied selectively to the cup take-out mechanisms when any of them becomes empty, and that at the time of sale, the cup is detached one by one from the lowest column of the cup group and supplied to a machine body side.

However, in the conventional drink cup supplying apparatus, there is a disadvantage in that, since the cup take-out mechanisms are disposed in the periphery off the orbit of the cup groups, when replenishing new cup groups onto the cup holding unit, cup groups which have been loaded on the cup take-out mechanisms become obstacles and interrupt the replenishing work from an arbitrary direction. Replenishing of cups needs to be conducted avoiding the cup take-out mechanisms, and therefore the cup replenishing work can not be conducted in a short time and easily.

As another conventional example, there has been developed such a drink cup supplying apparatus as shown in FIG. 1. The apparatus comprises a main body 1 capable of being opened and closed in both faces by a pair of the front and back divided doors 2 and 3, a circular track-shaped cup holding unit 4 provided within the main body 1, cup holding stands 5, on each of which vertically piled cup group (not shown) is placed, which are disposed in the cup holding unit 4 in a state being arranged in connected plural rows and capable of circling intermittently, cup take-out mechanisms 6 disposed every drink kind and in a row at peripheral positions in the front side A corresponding to the orbit X of the cup holding stands 5, and cup push-out-loading mechanisms 7 disposed at positions corresponding to the respective cup take-out mechanisms 6 for selectively pushing out to load the cup groups placed on the cup holding stands 5 into the cup take-out mechanisms 6.

However, in the drink cup supplying apparatus according to the above structure, also, the respective cup take-out mechanisms 6 are positioned in the periphery of the orbit X of the respective cup holding stands 5, and the respective cup push-out-loading mechanisms 7 are positioned inside the orbit X. And, in operation, the cup groups placed on the cup holding stands 5 corresponding to the respective cup take-out mechanisms 6 are pushed out by the respective cup push-out-loading mechanisms 7 from the back side to the respective cup take-out mechanisms 6 and loaded therein. Therefore, when opening the pair of the front and back divided doors 2 and 3 and supplying new cups to an emptied cup holding stand 5 for cup replenishment, cup groups which have been loaded in the cup take-out mechanisms 6 become obstacles, and replenishing of cup groups from the front side A can not be conducted. Namely, in the case of this conventional apparatus, there is a disadvantage in that cup replenishing work can not be conducted except from the back side B or the side C opposing to the position where the divided doors 2 and 3 are fitted.

In addition, when replenishing new cups from the back side B to the respective cup holding stands 5 on the respective cup take-out mechanisms 6 side, the work must be conducted, after the ceiling of the main body 1 of the apparatus corresponding to the respective cup holding stands 5 have been opened, from the upper part of the main body 1 because the respective cup push-out-loading mechanisms 6 interfere and obstruct the work. Therefore, cup replenishing work can not be conducted in a short time easily.

Also, There is another disadvantage in that at the time of maintenance and inspection of the cup push-out-loading mechanisms 7, the cup holding unit 4 needs to be removed, in other words, the apparatus is bad in maintenance characteristic, because the respective push-out-loading mechanisms 7 are disposed inside the orbit X of the respective cup holding stands 5.

SUMMARY OF THE INVENTION

Accordingly, it is an object of the invention to provide a drink cup supplying apparatus in which cup replenishing work can be conducted in a short time easily and maintenance characteristic can be improved.

According to the invention, a drink cup supplying apparatus, comprising:

A drink cup supplying apparatus, comprising:
- a plurality of cup stands, arranged with a predetermined interval on a closed track in a predetermined direction, for mounting a plurality of groups of piled cups thereon;
- means, arranged in a central space of said closed track, for receiving one group of said plurality of groups of piled cups to release one cup for service from a bottom of said one group;
- means, positioned on the outside of said closed track, for transferring a corresponding one of said plurality of groups of piled cups to said receiving means; and
- a door for closing said plurality of cup stands, said receiving means, and said transferring means, and for opening to load a group of piled cups on a corresponding one of said plurality of groups of piled cups.

According to the invention, a drink cup supplying apparatus, comprises:

A circular track-shaped cup holding unit enabled to be opened and closed in both faces by a pair of the front and back divided doors;

cup holding stands, disposed in the cup holding unit in a state of being arranged in connected plural rows and movable circularly and intermittently, for placing vertically piled cup groups thereon;

cup take-out mechanisms, disposed every drink kind and in a row at positions corresponding to an orbit of the respective cup holding stands, the respective cup take-out mechanisms being loaded with the cup groups and capable of detaching them one by one; and cup push-out-loading mechanisms, each being disposed at positions corresponding to the respective cup take-out mechanisms, for selectively pushing out the cup groups on the cup holding stands to the respective cup-take out mechanisms for loading;

wherein the respective cup take-out mechanisms being disposed in the inside of the orbit of the respective cup holding stands.

In the preferred embodiment, the cup push-out-loading mechanisms may be disposed on the reverse side of one of the divided doors.

That is to say, according to the drink cup supplying apparatus, in the circular track-shaped cup holding unit enabled to be opened and closed in both faces by the pair of the front and back divided doors, cup holding stands, on which vertically piled cup groups are placed, are disposed in a state that they are arranged in connected and plural rows and enabled to circle intermittently, and inside the orbit of the cup holding stands, the cup take-out mechanisms, in which the cup groups pushed out from the cup holding stands are loaded, are disposed. Therefore, at the time of cup replenishing, in the opened state of the divided doors, the cup groups can be supplied to the cup holding stands from an arbitrary direction around the cup holding unit.

Further, by disposing the cup push-out-loading mechanisms in the reverse side of one of the divisional doors, maintenance characteristics at the time of maintenance and inspection of the apparatus can be improved.

BRIEF DESCRIPTION OF THE DRAWINGS

The invention will be described in conjunction with the appended drawings, wherein.

DETAILED DESCRIPTION OF THE PREFERRED EMBODIMENT

Figure 1:
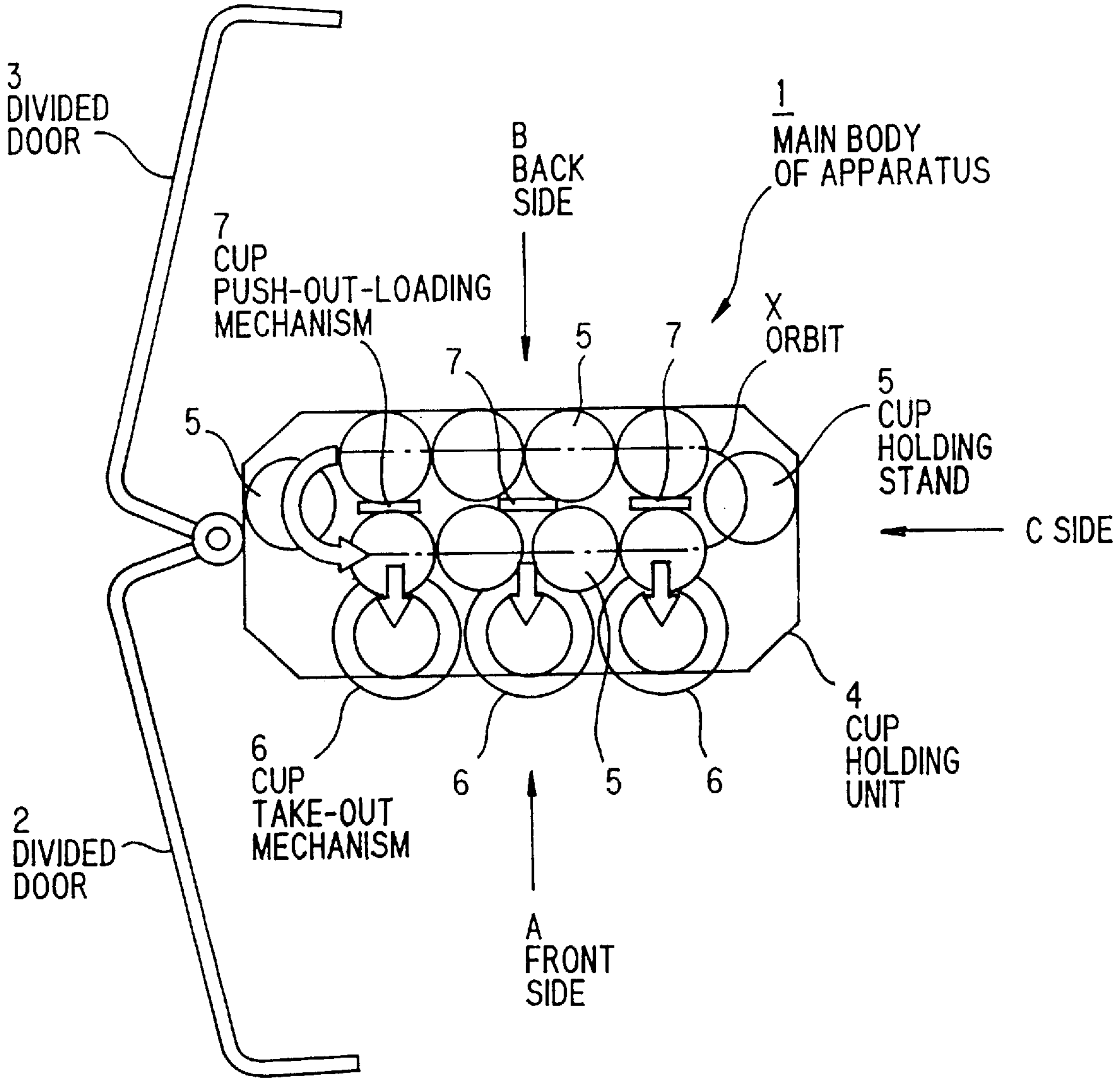
FIGURE 1 PRIOR ART
FIG. 1 is a plan view showing briefly a conventional drink cup supplying apparatus in door opened state.

A preferred embodiment of the invention is explained in details below referring to the drawings shown in FIG. 2 and FIG. 3. In these drawings, parts like those of the conventional drink cup supplying apparatus shown in FIG. 1 are indicated using the same numerals.

Figure 2:
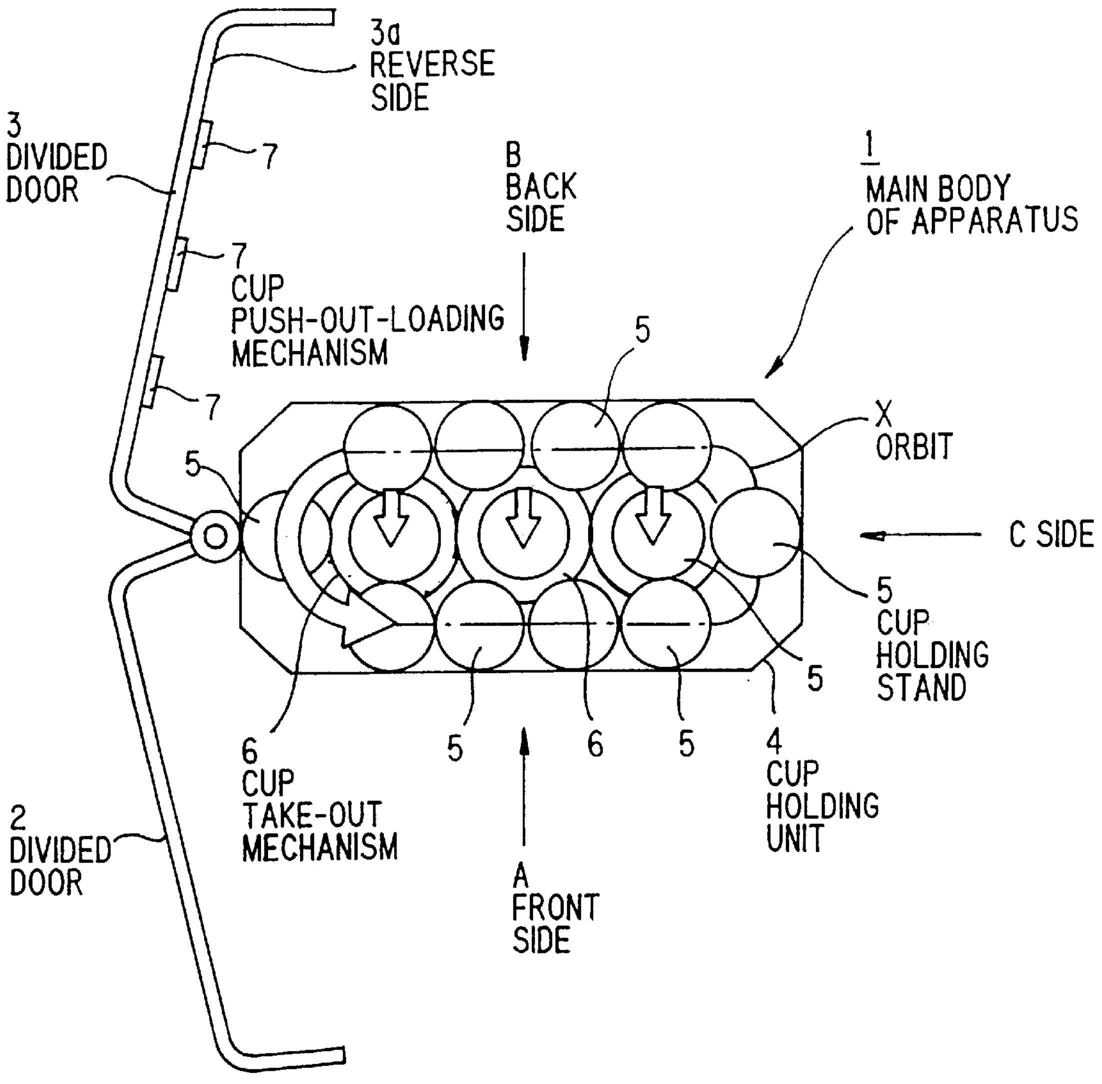
FIG. 2 is a plan view showing briefly a drink cup supplying apparatus in door opened state in the preferred embodiment according to the invention.

As shown in FIG. 2, a drink cup supplying apparatus according to the invention, like the conventional one shown in FIG. 1, a pair of the front and back divided doors 2 and 3, which open in both faces and are removable, are fitted in one side of the main body 1 of the apparatus. These divided doors 2 and 3 are enabled to open and close freely so as to be able to blockade both of the front and back sides A and B (including one side C) of the main body 1.

In the main body 1 of the apparatus, a cup holding unit 4 having circular track shape is provided. And, in the cup holding unit 4, cup holding stands 5, on which vertically piled cup groups (not shown) are placed, are disposed in arranged plural rows in connected state and enabled to move circularly and intermittently by a driving system not shown.

On the other hand, in the inside of the orbit X of the respective cup holding stands 5, cup take-out mechanisms 6 are disposed every drink kind and in a row, and cup push-out-loading mechanisms 7, which selectively push out the cup groups placed on the cup holding stands 5 for loading, are disposed at corresponding positions to the respective cup take-out mechanisms 6. The cup push-out-loading mechanisms 7 are provided on the reverse side 3*a* of one divided door 3 which opens and closes the back side B of the main body 1. The details of the cup push-out-loading mechanisms 7 are described later.

Here, the operation of the drink cup supplying apparatus according to the invention is explained.

Before starting the initial operation, the divided doors 2 and 3 of the main body 1 of the apparatus are opened, and cup groups are loaded on each of the respective cup holding stands 5 and the respective cup take-out mechanisms 6 by packing them from around the cup holding unit 4. Thereafter, the divided doors 2 and 3 are closed, and the apparatus is made operative by making power supply.

In this state, when the sale of a drink is conducted, the cup take-out mechanism 6, in which the cup group corresponding to the kind of the drink is loaded, is driven in accordance with the sale signal, and the cup is detached in order one by one from the lowest column of the cup group and supplied to a take-out window (not shown) side of the machine.

When the cup in any one of the respective cup take-out mechanisms runs out, its state is detected by a detecting means (not shown) and the detected empty signal is output to the control unit of a driving system not shown. Then, by drive of the driving system, the cup holding stand 5 in the cup holding unit 4 circles to the position corresponding to the emptied cup take-out mechanism 6 and stops there, and the cup group placed on the cup holding stand 5 is pushed out toward the inside of the orbit X of the cup holding stands 5 by the corresponding cup push-out-loading mechanism 7 to fill the emptied cup take-out mechanism 6.

Figure 3A:
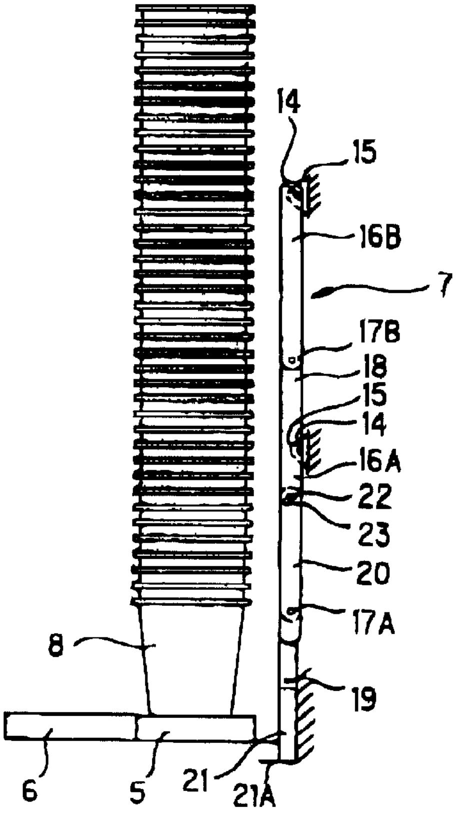
FIG. 3A is a side view showing briefly the waiting condition of a cup push-out-loading mechanism in the drink cup supplying apparatus in FIG. 2.
Figure 3B:
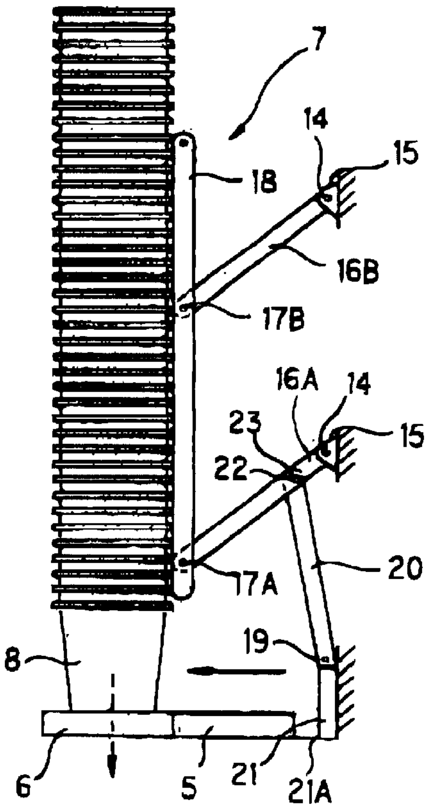
FIG. 3B is a side view showing briefly the initial driving condition of a cup push-out-loading mechanism in the drink cup supplying apparatus in FIG. 2.

The behavior of the cup push-out-loading mechanism 7 is explained in more detail referring to FIG. 3. In FIG. 3(A) showing the waiting condition in the behavior, the piled cups 8 are installed on the cup holding stands 5 formed on a conveyor. The cup push-out-loading mechanism 7 is in the liner form to the perpendicular direction along the supporting unit 15 and its surface in the cup contact side of the pushing material 18 is flat with the gap fill plate (not shown). In case that all cups set in the cup take-out mechanism 6 are completely used, the cup sold-out signal is output to the vending control unit by a sensor (not shown) and the vending control unit indicates the cup holding stand 5 (conveyor) to run so that the piled cups 8 for supplement may be installed in a position corresponding to the cup take-out mechanism 6 in which all cups are sold out.

In FIG. 3(*b*) showing the initial driving condition of the cup push-out-loading mechanism 7, the driving slider 21 is elevated by the driving material (not shown) to move the pin 22 of the link 20 connected to the pin 19 toward the direction of the piled cups 8 along the guide groove 23, whereby the pin 22 moves to the left side of horizontally by a predetermined distance in accordance with the shape of guide groove 23. A clockwise rotating power round the pin 14 is given the link 16A depending this transport. The rotating power is transmitted through the pushing material 18 to the link 16B to rotate the link 16B until it is contact with the piled cups 5, and then, the piled cups horizontally moves from the cup holding stand 5 to the cup take-out mechanism 6. When the elevating power given by the driving slider 21 is released after the piled cups 8 are moved, a rotating power in the counterclockwise direction is given the links 16A and 16B by the empty weight of the pushing material 18, the links 16A and the link 16B, whereby the link 16A and the link 16B are rotated to the waiting position as shown in FIG. 3(A). Since the center of gravity of the cup push-out-loading mechanism 7, in the waiting position, is in the left side of horizontal direction to the pins 14, 22 and 19, a rotating power in the counterclockwise direction round the pin 14 is given by the empty weight of the cup push-out-loading mechanism 7, whereby the links 16A, 16B, the pushing material 18, the links 20 and the driving slider 21, which constitute the cup push-out-loading mechanism 7, are housed in the liner form to the perpendicular direction.

A cam material driven by a motor can be used as the driving material providing the elevating power to the driving slide 21.

Next, when the cup groups on the respective cup holding stands 5 in the cup holding unit 4 decrease, as is the case with the cup take-out mechanisms, the state is detected by the detecting means, a warning of "cups run out" is indicated, and the replenishing of cups is conducted according to the warning indication.

In such cup replenishing work, when the divided doors 2 and 3 of the main body 1 are opened, the cup push-out-loading mechanisms 7 provided on the reverse side 3*a* of the divided door 3 become positioned apart from the cup holding unit 4. Also, since the cup take-out mechanisms 6 are located inside the orbit X of the cup holding stands 5, any tangible obstacles do not exist around the cup holding stands 5 except the fitting part of the divided doors 2 and 3, and both the outer and inner sides of the cup holding stands 5 are opened.

Therefore, it becomes practicable to replenish the cup groups from an arbitrary direction of the front side A. the back side B and the side C, so that the cup replenishing work is conducted easily in a short time. Also, the maintenance and inspection work for the cup push-out-loading mechanisms 7 becomes easier.

As mentioned in details above, a drink cup supplying apparatus according to the invention features that it comprises a circular track-shaped cup holding unit enabled to be opened and closed in both faces by a pair of the front and back divided doors, cup holding stands disposed in the cup holding unit in a state of being arranged in connected plural rows and movable circularly and intermittently, for placing thereon vertically piled cup groups, cup take-out mechanisms disposed every drink kind and in a row at positions corresponding to an orbit of the respective cup holding stands, each of which being capable of loading with the cup group and detaching them one by one, and cup push-out-loading mechanisms, each being disposed at positions corresponding to the respective cup take-out mechanisms and selectively pushing out the cup groups placed on the cup holding stands to the respective cup-take out mechanisms for loading, wherein the respective cup take-out mechanisms being disposed in the inside of the orbit of the respective cup holding stands. In addition, in the above structure, the cup push-out-loading mechanisms may be disposed on the reverse side of one of the divided doors.

Accordingly, in a state that the divided doors are opened for the replenishment of cups, the cup groups can be placed and replenished on the cup holding unit from an arbitrary direction around the cup holding unit, so that the cup replenishing work is conducted in a short time and easily. Also, in case the cup push-out-loading mechanisms are disposed on the reverse side of one of the divided doors, maintenance characteristics at the time of maintenance and inspection of the apparatus can be improved.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds are therefore intended to be embraced by the claims.

What is claimed is:

1. A drink cup supplying apparatus, comprising:

a circular track-shaped cup holding unit enabled to be opened and closed in both faces by a pair of divided doors, the pair of divided doors including a front door and a back door;

a plurality of cup holding stands for placing vertically piled cup groups thereon, said cup holding stands being disposed in said cup holding unit arranged in connected plural rows and movable circularly and intermittently, a plurality of cup take-out mechanisms, disposed in a row at positions corresponding to an orbit of respective cup holding stands, said respective cup take-out mechanisms being loaded with said cup groups and capable of detaching cups from a cup-group one by one; and a plurality of cup push-out-loading mechanisms, for selectively pushing out said cup groups on said cup holding stands to said respective cup take-out mechanisms for loading each push-out-loading mechanism being disposed at positions corresponding to said respective cup take-out mechanisms;

wherein the respective cup take-out mechanisms are disposed inside of the orbit of said respective cup holding stands.

2. A drink cup supplying apparatus, as defined in claim 1, wherein:

said cup push-out-loading mechanisms are disposed on a reverse side of one of said front door and back door.

3. A drink cup supplying apparatus, comprising a plurality of cup stands, arranged with a predetermined interval on a closed orbital path in a predetermined direction, for mounting a plurality of groups of piled cups thereon;

receiving means, arranged in a central space of said closed orbital path, for receiving one group of said plurality of groups of piled cups to release one cup for service from a bottom of said one group;

a transferring means, positioned on the outside of said closed orbital path, for transferring a corresponding one of said plurality of groups of piled cups to said receiving means; and a door for closing said plurality of cup stands, said receiving means and said transferring means, and for opening to load a group of piled cups on a corresponding one of said plurality of groups of piled cups.

4. A drink cup supplying apparatus, according to claim 3, wherein said transferring means is provided on a rear side of said door.

5. A drink cup supplying apparatus, according to claim 3, wherein;

said receiving means comprises a plurality of cup-receiving and releasing units; and said transferring means comprises a plurality of cup-pushing units.

6. A drink cup supplying apparatus, according to claim 3, wherein:

said door comprises front and rear doors connected at an end of each of the front and rear doors by a hinge.

* * * * *